United States Patent
Backes (10) Patent No.: US 8,269,202 B2
(45) Date of Patent: Sep. 18, 2012

(54) OPTICAL SENSOR DEVICE

(75) Inventor: Ulrich Backes, Radolfzell (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 481 days.

(21) Appl. No.: 12/386,643

(22) Filed: Apr. 21, 2009

(65) Prior Publication Data
US 2009/0261237 A1 Oct. 22, 2009

(30) Foreign Application Priority Data

Apr. 22, 2008 (DE) .................. 10 2008 020 171

(51) Int. Cl.
G01J 1/42 (2006.01)
H01L 31/00 (2006.01)
(52) U.S. Cl. .................. 250/573; 250/574; 250/216
(58) Field of Classification Search .............. 250/341.1, 250/349, 221, 216, 573, 574; 73/170.17; 356/338, 342
See application file for complete search history.

(56) References Cited

U.S. PATENT DOCUMENTS

| | | | |
|---|---|---|---|
| 4,936,657 A * | 6/1990 | Tejima et al. | 349/7 |
| RE35,534 E * | 6/1997 | Claytor | 359/742 |
| 5,895,183 A * | 4/1999 | McDaniel et al. | 409/179 |
| 6,064,059 A | 5/2000 | Pientka et al. | |
| 6,292,295 B1 * | 9/2001 | Yamashita et al. | 359/460 |
| 6,348,684 B1 * | 2/2002 | Nykolak et al. | 250/216 |
| 7,236,249 B1 | 6/2007 | Michenfelder et al. | |
| 7,251,084 B2 * | 7/2007 | Shimura | 359/742 |
| 7,414,237 B2 | 8/2008 | Richwin et al. | |
| 2004/0075828 A1 | 4/2004 | Sautter et al. | |
| 2005/0046939 A1 | 3/2005 | Yoshikawa et al. | |
| 2007/0235638 A1 | 10/2007 | Backes et al. | |
| 2009/0032689 A1 | 2/2009 | Backes | |

FOREIGN PATENT DOCUMENTS

| | | |
|---|---|---|
| DE | 3624188 | 3/1991 |
| DE | 19701258 | 7/1997 |
| DE | 19608648 | 10/1997 |
| DE | 19830120 | 2/1999 |
| DE | 102007036492 | 2/2009 |
| EP | 1068112 | 1/1999 |
| EP | 2020348 | 6/2009 |
| GB | 2179484 | 3/1987 |
| JP | 11505030 | 5/1999 |
| JP | 200577767 | 3/2005 |
| JP | 2007278711 | 10/2007 |
| JP | 2007304090 | 11/2007 |
| WO | WO03026937 | 4/2003 |
| WO | WO2006/005558 | 1/2006 |

* cited by examiner

Primary Examiner — Tony Ko
(74) Attorney, Agent, or Firm — Tarolli, Sundheim, Covell & Tummino LLP (57) ABSTRACT

An optical sensor device has a sensor unit which includes a light emitter (24), a light receiver (26), and a lens plate (12) that is used for coupling a pencil of rays, radiated by the light emitter (24), into and out of the pane and directing it onto the light receiver (26). The lens plate (12) includes a combined Fresnel structure (16a, 16b) having a Fresnel lens structure (18a, 18b) and a Fresnel reflector structure (20a, 20b) on a first surface (12a) facing the light emitter (24) and the light receiver (26), and a Fresnel reflector structure (22a, 22b) on an opposite, second surface (12b) facing the pane. This configuration is especially suitable for use as a rain sensor. Without the light emitter the sensor device is suitable to be used as a light sensor.

20 Claims, 6 Drawing Sheets

OPTICAL SENSOR DEVICE

TECHNICAL FIELD

The present invention relates to an optical sensor device which is adapted to be coupled to a pane, in particular to a windshield of a motor vehicle.

BACKGROUND OF THE INVENTION

Sensor devices of this type are mainly used as rain sensors in motor vehicles for an automatic actuation of the windshield wipers and as light sensors for controlling the vehicle lighting. The use of traditional lenses to influence the beam path, such as, e.g., the lenses of the rain sensor shown in EP 1 068 112 B1, which are inclined towards the windshield, requires a comparatively large amount of space.

The use of holographic structures allows to realize smaller designs, as is known from, e.g., WO 03/026937 A1. These sensors are based on the principle of light diffraction with the aid of diffractive elements and therefore have the principle-induced drawback of a substantially lower useful luminous efficiency and a higher sensitivity to stray light.

DE 196 08 648 C1 proposes an optical sensor device in which the light entry and exit surfaces of the light conducting unit are configured in the form of Fresnel lenses. But since the surfaces of the light conductor in which the lenses are configured are perpendicular to the surface of the pane, this device requires a very large amount of space.

The basic disadvantages of prior art optical rain sensor or daylight sensor devices are found in the high production expense and in the unfavorable ratio of the sensor dimensions to the size of the use-sensitive surface area.

It is and object of the invention to provide an optical sensor device which, with optimum optical conditions, requires only very little structural space and has a sensitivity which is as low as possible to forefield objects and extraneous light.

BRIEF SUMMARY OF THE INVENTION

According to a first embodiment of the invention, an optical sensor device is adapted to be coupled to a pane and comprises a sensor unit which includes a light emitter, a light receiver, and a lens plate that is used for coupling a pencil of rays, radiated by the light emitter, into and out of the pane and directing it onto the light receiver. The lens plate includes a combined Fresnel structure having a Fresnel lens structure and a Fresnel reflector structure on a first surface facing the light emitter and the light receiver, and a Fresnel reflector structure on an opposite, second surface facing the pane. This configuration is especially suitable for use as a rain sensor.

In this case, the sensor unit in the lens plate has two separate, combined Fresnel structures, adjacent to each other, having oppositely located Fresnel reflector structures. The light emitter is arranged in the focal point of one Fresnel lens structure and the light receiver is arranged in the focal point of the other Fresnel lens structure. The pencil of rays emitted by the light emitter is collimated by the one combined Fresnel structure, passes perpendicularly through the lens plate, is directed against the pane at an angle by the appropriate Fresnel reflector structure and totally reflected by the pane, and is then coupled into the lens plate by the Fresnel reflector structure that is associated with the other combined Fresnel structure, and is directed perpendicularly through the lens plate onto the other combined Fresnel structure and focused on the light receiver by the other combined Fresnel structure. The fact that all optically active elements are concentrated in the lens plate results in a minimum space required. At the same time, a large useful sensor surface on the pane is obtained.

According to a second embodiment of the invention, an optical sensor device is adapted to be coupled to a pane and comprises a sensor unit which includes a light receiver and a lens plate that is used for coupling a pencil of rays incident on the pane out of the pane and directing it onto the light receiver. The lens plate includes a combined Fresnel structure having a Fresnel lens structure and a Fresnel reflector structure on a first surface facing the light receiver, and a Fresnel reflector structure on an opposite, second surface facing the pane. This configuration is especially suitable for use as a light sensor.

In this case a pencil of rays impinging parallely on the pane passes through it at an angle and is then coupled into the lens plate by the Fresnel reflector structure and directed perpendicularly through the lens plate onto the combined Fresnel structure and focused on the light receiver by the other combined Fresnel structure. Here, too, all optically active elements are concentrated in the lens plate, so that a minimum space requirement is obtained. At the same time, an excellent directional effect is achieved for the light to be detected.

In an advantageous embodiment of a rain/light sensor, both configurations of the optical sensor device are combined and share a common lens plate having all combined Fresnel structures and Fresnel reflector structures formed therein.

DETAILED DESCRIPTION OF THE PREFERRED EMBODIMENTS

Figure 1:
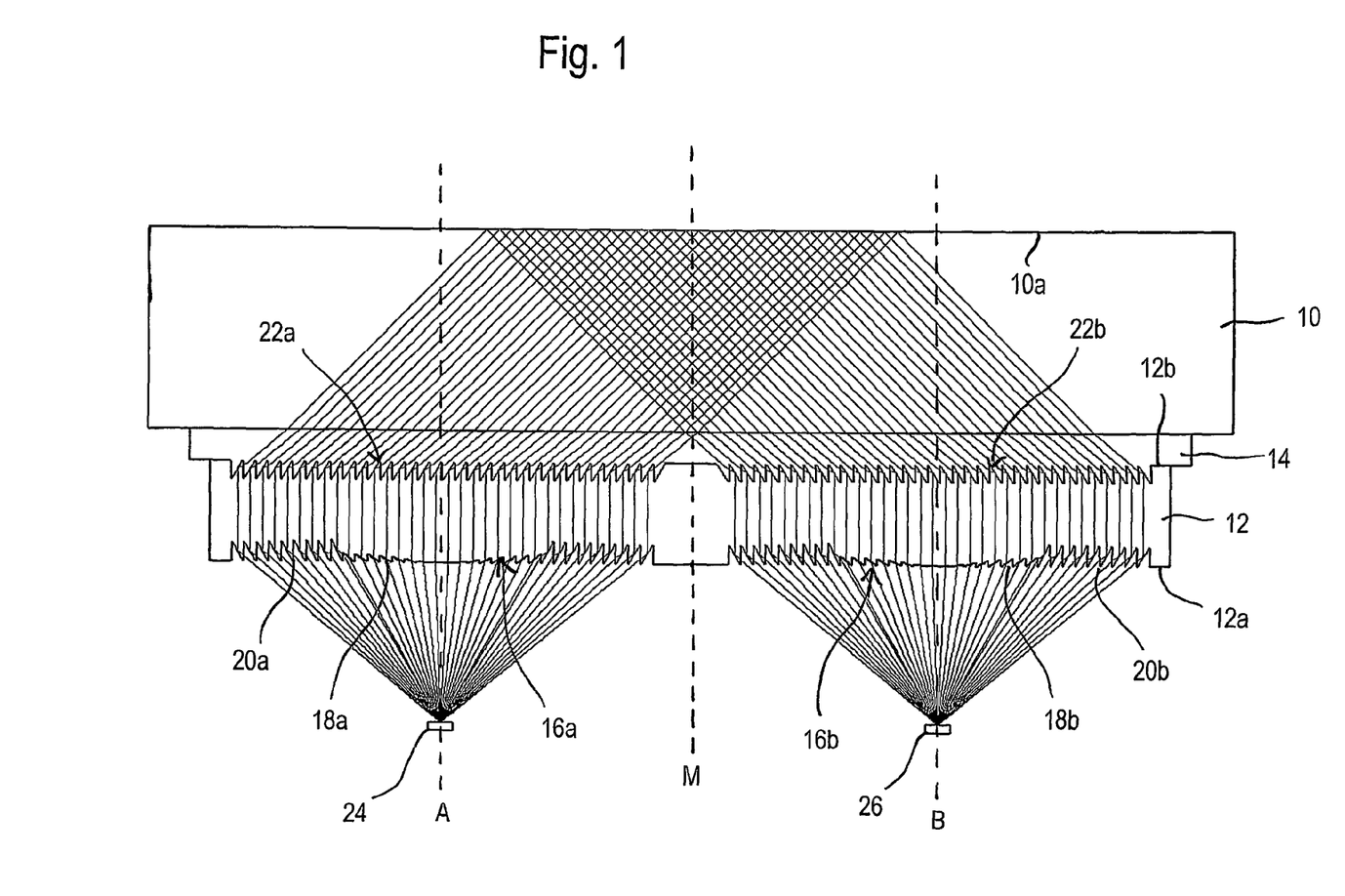
FIG. 1 schematically shows a diagrammatic sectional view of a sensor unit of a rain sensor.

A rain sensor is typically comprised of two identical optical sensor units. A sensor unit of this type is schematically illustrated in FIG. 1. The sensor unit is attached to the windshield 10 of a motor vehicle. The optically active element of the sensor unit is a lens plate 12. The lens plate 12 is optically coupled to the windshield 10 by means of a coupler layer 14.

On a first surface 12a facing away from the windshield 10, the lens plate 12 is provided with two identical Fresnel structures 16a, 16b, which are arranged at a small distance from each other. Both Fresnel structures 16a, 16b are designed to be rotationally symmetrical with respect to an axis A and B, respectively. The Fresnel structures 16a, 16b may be divided into an inner part and an outer part, the outer part having a larger radial distance from the axis A or B than the inner part. The inner part constitutes a Fresnel lens structure 18a and 18b; the outer part constitutes a Fresnel reflector structure 20a and 20b. In the following, the Fresnel structures on the first surface 12a of the lens plate 12 facing away from the windshield 10 are therefore referred to as combined Fresnel structures 16a, 16b.

Figure 1A:
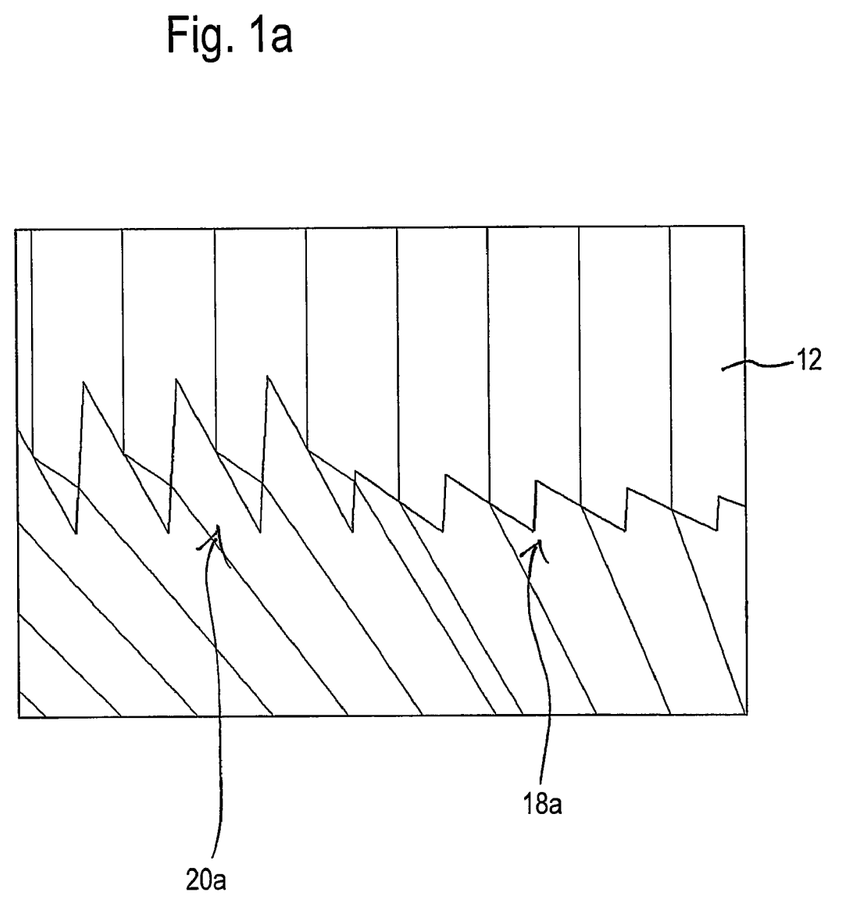
FIG. 1a schematically shows an enlarged detail of the bottom Fresnel structure of FIG. 1.

As can be seen in particular in the enlargement of a detail in FIG. 1a, both the Fresnel lens structure 18a and 18b and the Fresnel reflector structure 20a and 20b have a sawtooth-type profile, the flanks of the Fresnel reflector structure 20a and 20b facing the axis A and B, respectively, being steeper and longer than the corresponding flanks of the Fresnel lens structure 18a and 18b.

On a second surface 12b facing the windshield 10, opposite to the combined Fresnel structures 16a, 16b, the lens plate 12 is provided with two Fresnel reflector structures 22a, 22b which are mirror-symmetrical in relation to the center plane M of the lens plate 12. Similar to the Fresnel reflector structures 20a, 20b of the first surface 12a, the Fresnel reflector structures 22a, 22b of the second surface 12b also consist of fine surface formations which are alternately raised and recessed.

A light emitter 24 is disposed in the focal point of the Fresnel lens structure 18a, which lies on the associated axis A of rotational symmetry. A light receiver 26 is disposed in the focal point of the Fresnel lens structure 18b, which lies on the associated axis of rotational symmetry B.

The light emitter 24 radiates light in a particular frequency range; in this connection, the term "light" is not limited to visible light, but may more particularly be radiation in the infrared range. The diverging pencil of rays emitted by the light emitter 24 is reshaped by the combined Fresnel structure 16a into parallel light which traverses the lens plate 12 perpendicularly. The combined Fresnel structure 16a here is designed such that those rays of the pencil of rays which are incident on the Fresnel lens structure 18a are only refracted, whereas those rays of the pencil of rays which are incident on the Fresnel reflector structure 20a are refracted and reflected (see FIGS. 1 and 1a). In the final analysis, all rays are given the same direction, so that as a whole a parallel pencil of rays is produced.

As will be understood with reference to FIG. 1a, the (radial) position of the border between the Fresnel lens structure 18a and 18b and the Fresnel reflector structure 20a and 20b depends on the angle of incidence of the light rays of the pencil of rays from the light emitter 24 onto the right-hand flanks (according to the illustration in FIG. 1a) of the Fresnel lens structure 18a at which the light rays are refracted. The inclination of these flanks is predefined in that the refracted rays are intended to run perpendicularly through the lens plate 12. As the radial distance from the axis A increases, this causes the angle of incidence to become smaller and smaller. A sensible transition to the Fresnel reflector structure 20a is provided at that point at which the angle of incidence would fall below a predetermined value (that is, the light rays would be incident on the flanks at too small an angle).

Having passed through the lens plate 12, the parallel pencil of rays is reflected by the Fresnel reflector structure 22a at an angle to the plane of the lens plate 12 and enters the coupler layer 14. Upon passing through the coupler layer 14, the pencil of rays enters the windshield 10 and is totally reflected at the opposite internal surface 10a thereof. It then passes through the windshield 10 again, enters the coupler layer 14 and is deflected by the Fresnel reflector structure 22b so that it passes perpendicularly through the lens plate 12. The combined Fresnel structure 16b eventually transforms the parallel pencil of rays into a converging pencil of rays which impinges on the light receiver 26.

The Fresnel reflector structures 22a, 22b exhibit a few special features which will now be explained with reference to FIG. 2. The surface formations of the Fresnel reflector structures 22a, 22b are generally sawtooth-shaped in cross-section and constitute a multitude of prism-like sections. A first flank 22, extends continuously straight from the base to the apex; a second flank consists of two sections $22_2$ and $22_3$. The section $22_2$ of the second flank (on the right in FIG. 2) is less steep than the second section $22_3$, which is also steeper than the flank $22_1$.

The refractive indices n1 and n2 of the respective materials from which the lens plate 12 and the coupler layer 14 are made are carefully matched, as are the angles at the flanks of the sawtooth-shaped reflector structures 22a, 22b. A light ray L that passes perpendicularly through the lens plate 12 is incident on the flank $22_1$ at an acute angle $\alpha$, is totally reflected, and is incident on the flank $22_2$ at an angle $\beta$. In the configuration shown in FIG. 2, the angle $\beta$ is equal to 90 degrees, so that the exit angle $\gamma$ also amounts to 90 degrees. As a result, no refraction of light occurs at the flank $22_2$.

The refractive indices n1 and n2 differ only slightly from each other. A condition for the total reflection of the light ray on the flank $22_1$ is that the angle of incidence is larger than the arc sine of the ratio of the refractive indices. Since the ratio of the refractive indices differs only slightly from 1, the angle of incidence $\alpha$ must be relatively flat. For example, a maximum angle of incidence $\alpha$ of approx. 26 degrees results for the pairing of materials of polycarbonate for the lens plate 12 and silicone rubber for the coupler layer 14. This angle determines the minimum steepness of the reflector structure. The actual steepness is determined in that the light ray exiting towards the windshield 10 has the angle necessary for the total reflection on the pane. The angle of entry desirable for the total reflection on the windshield 10 typically amounts to approx. 45 degrees. This angle is compatible with the demands made on the geometry of the Fresnel reflector structures 22a, 22b.

Figure 2:
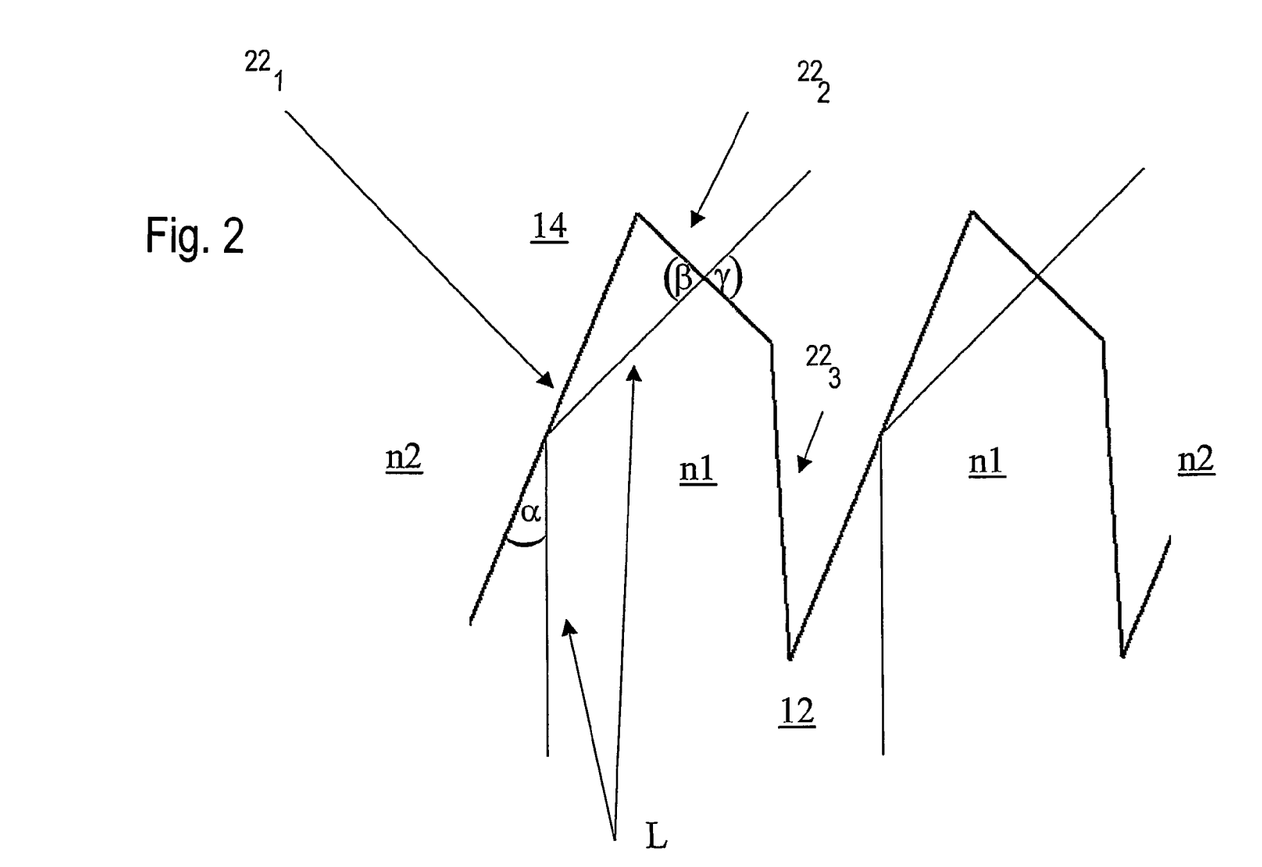
FIG. 2 schematically shows an enlarged sectional view of a Fresnel reflector structure.

FIG. 3a again schematically shows the light conduction which can be achieved with the geometry of the Fresnel reflector structures 22a, 22b illustrated in FIG. 2. No light refraction occurs at the boundary layer between the lens plate 12 and the coupler layer 14. The consequence is a non-optimum illumination of the sensor surface formed by the totally reflecting surface of the windshield 10.

Figure 3:
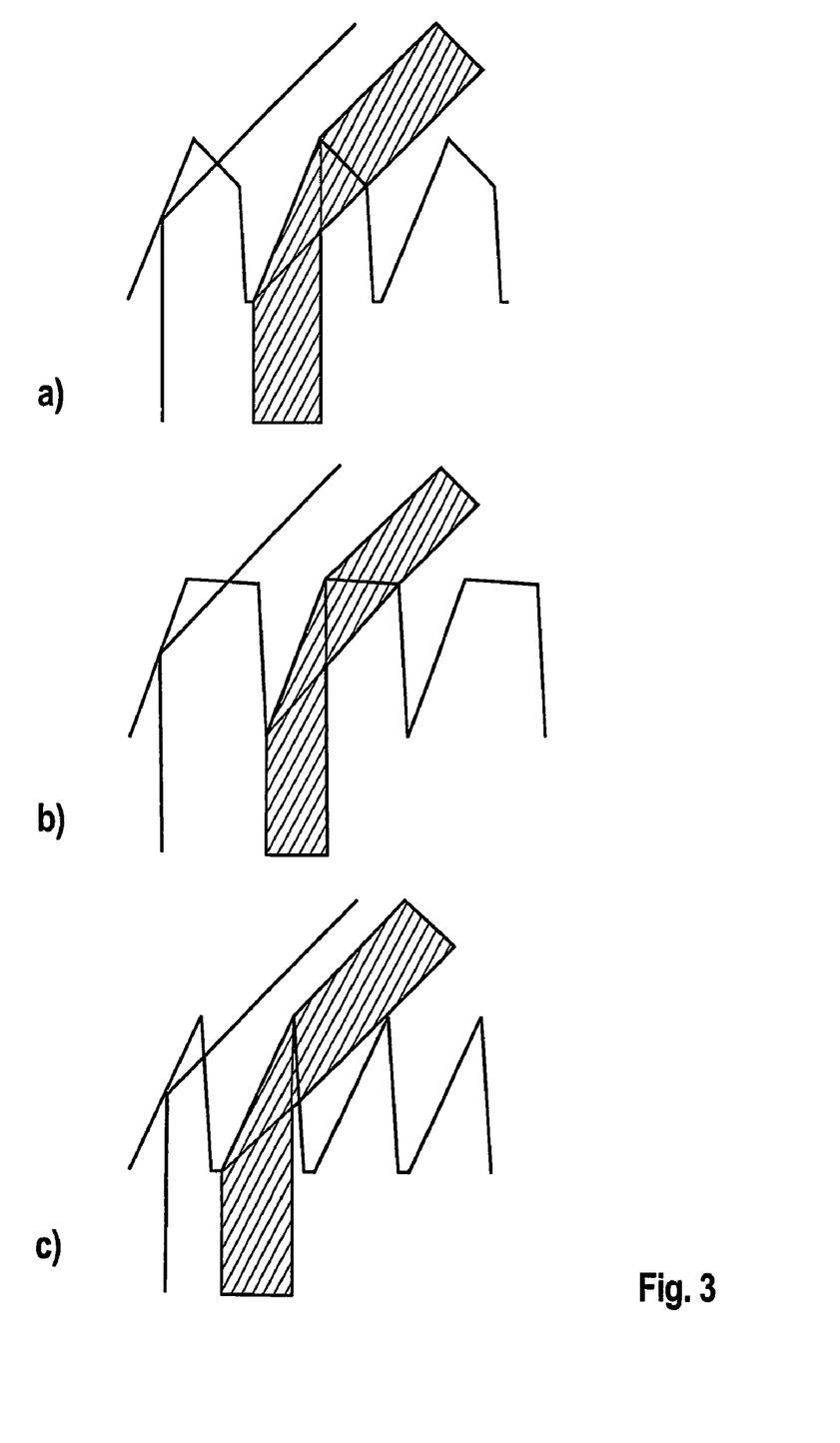
FIGS. 3a to 3c schematically show corresponding cross-sectional views of different embodiments.

The conditions are even more unfavorable in FIG. 3b, where the section $22_2$ at the right-hand flank of the sawtooth structure is even flatter. Since the light rays are incident on the flank $22_2$ at an angle different from 90 degrees, a light refraction in a mathematically negative direction (to the right in FIG. 3b) occurs. The exiting pencils of rays are even narrower than in FIG. 3a.

Optimum illumination conditions are shown for the geometry in FIG. 3c. Here the right-hand flank of the sawtooth structure in this Figure is undivided and continuous and made to be steeper than the left-hand flank. On the right-hand flank a light refraction occurs in a mathematically positive sense (to the left in FIG. 3c). The angle of impact for the light ray on the left-hand flank is still compatible with the condition for total reflection. The pencil of rays refracted at the right-hand flank just touches the apex of a neighboring sawtooth structure. This produces a complete illumination of the sensor surface on the windshield 10.

Figure 4:
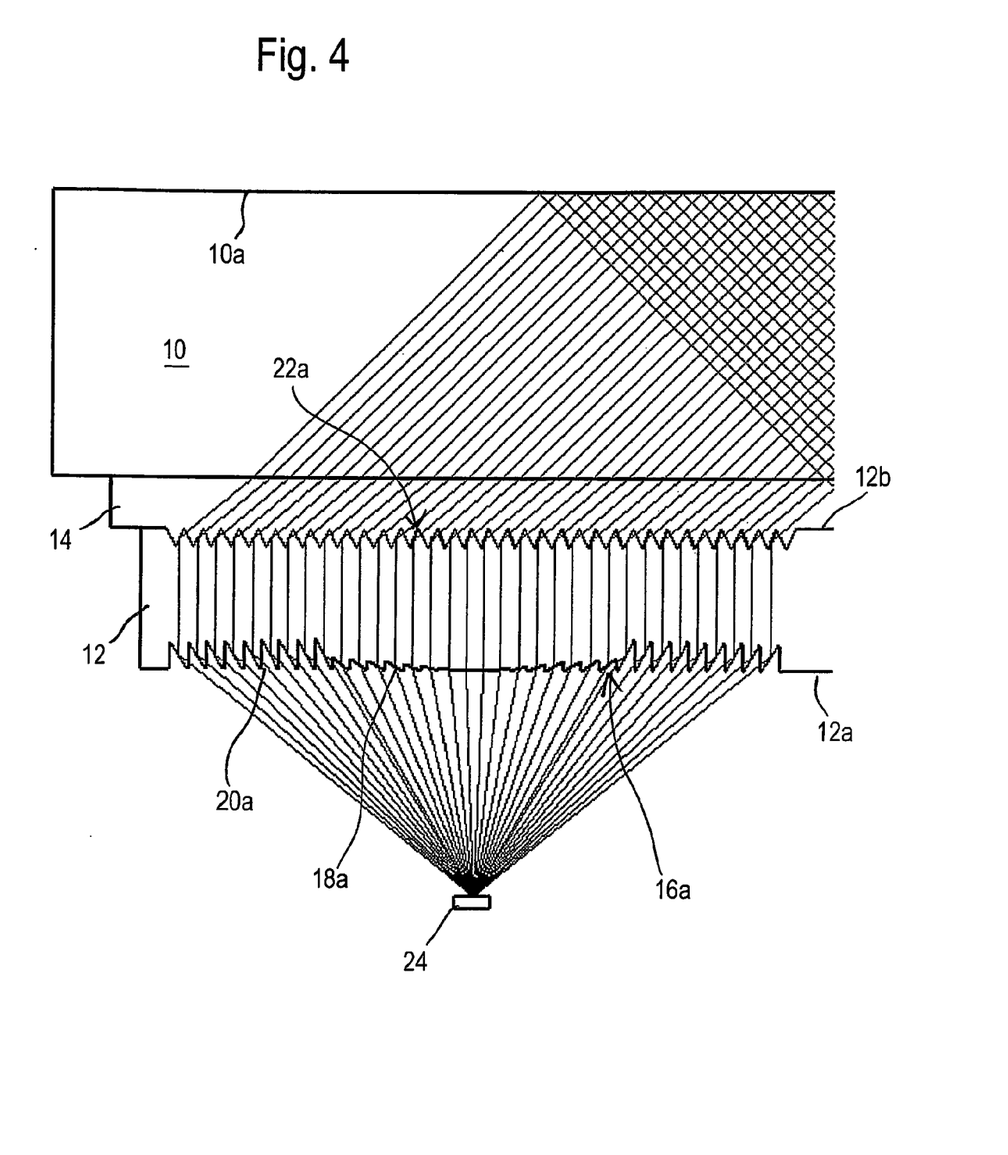
FIG. 4 schematically shows a diagrammatic sectional view of the light emitter side of a special embodiment of a sensor unit of a rain sensor.

In accordance with a different approach, the principle explained just above of an illumination that is as comprehensive as possible of the sensor surface is partly abandoned in favor of an improved extraneous light suppression. In fact, it has to be taken into account that extraneous light (e.g., sunlight) acting from outside of the windshield 10 may likewise be incident on the light receiver 26. Tests and simulations have shown that within the outline conditions discussed above a substantially symmetrical design of the sawtooth structure results in a best possible insensitivity to extraneous light. An embodiment configured in accordance with this approach is shown in FIG. 4.

A symmetrical design in this context is intended to mean that the left-hand and right-hand flanks are straight (without a subdivision) and have substantially the same inclination relative to the plane of the windshield 10 or the lens plate 12. In addition, the "substantially" symmetrical design of the sawtooth structure is intended to explicitly include deviations within a usual tolerance range and take the differences in the refractive indices of the lens plate 12 and the coupler layer 14 into consideration.

For a perfect function of the above-described configurations of the Fresnel reflector structures 22a, 22b it is necessary for the material of the coupler layer 14 to be in contact with the surface of the reflector structures 22a, 22b in a form-fitting manner and without inclusion of air bubbles or the like.

Figure 5:
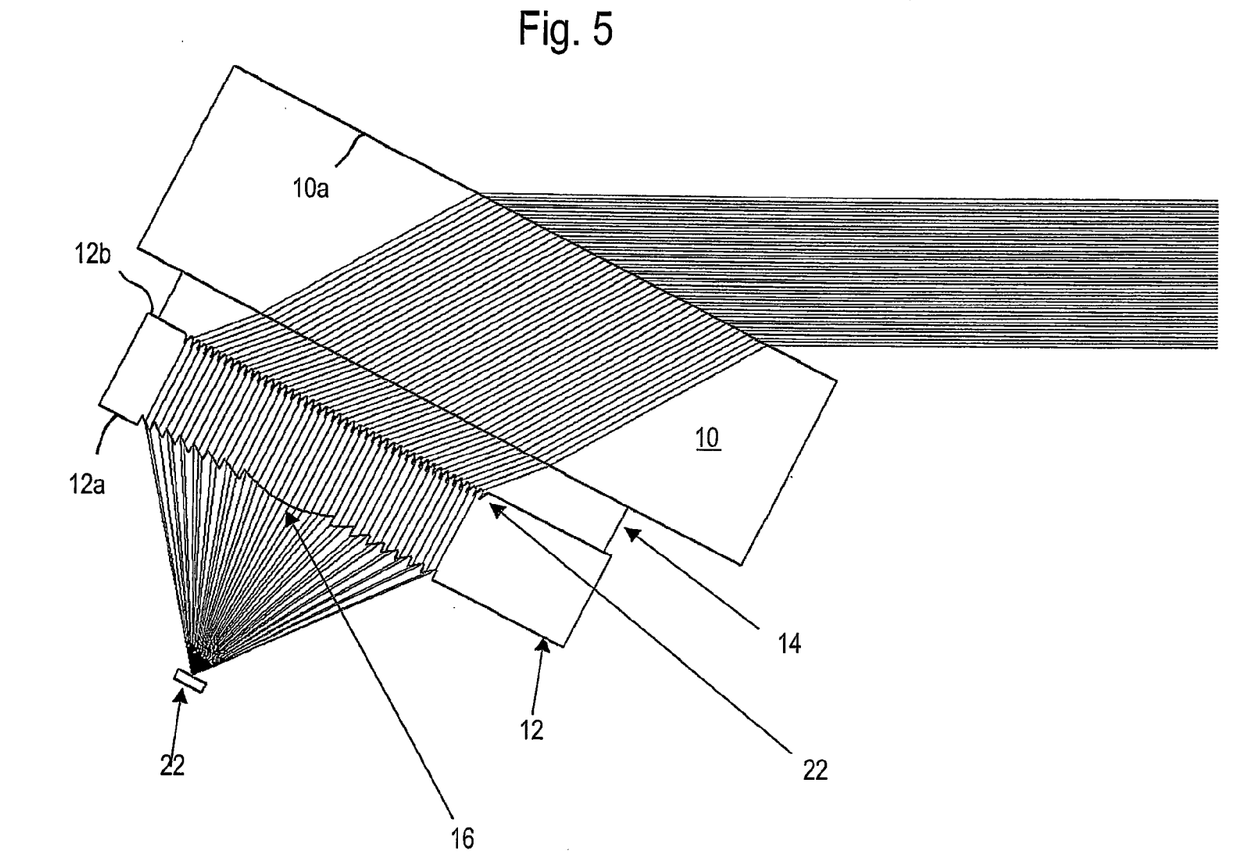
FIG. 5 schematically shows a diagrammatic sectional view of a daylight sensor.

The embodiment of an optical sensor device shown in FIG. 5 is a direction-sensitive daylight sensor. The sensor unit shown here again has a lens plate 12 serving as the optical element; in this case the lens plate only has a combined Fresnel structure 16 and, located opposite thereto, a corresponding Fresnel reflector structure 22. The combined Fresnel structure 16 is of the same construction as in the rain sensor devices illustrated in FIGS. 1 and 4 and accordingly includes an (inner) Fresnel lens structure and an (outer) Fresnel reflector structure, although only a Fresnel lens structure is shown for the sake of simplicity in FIG. 5.

The light receiver 26 is disposed in the focal point of the Fresnel lens structure. The lens plate 12 is coupled to the windshield 10 by means of the coupler layer 14, the angle of inclination of the windshield 10 amounting to approx. 27 degrees in the exemplary embodiment shown. For the geometry of the Fresnel reflector structure 22 the same criteria are applicable as for the embodiments described previously, which relate to a rain sensor.

The daylight sensor is sensitive to light that is incident on the windshield 10 horizontally and is refracted obliquely downwards upon its incidence on the pane and passes through the coupler layer 14 to impact the Fresnel reflector structure 22, which deflects the light rays and directs them perpendicularly through the lens plate 12 and onto the combined Fresnel structure 16, which focuses the light onto the light receiver 26.

In practice, combined rain/light sensors are required. The rain sensor contains a number of sensor units of the type as shown in FIG. 1 or FIG. 4.

The sensor units are arranged adjacent to each other and share a common lens plate 12. The optically active structures of the daylight sensor shown in FIG. 5 are also arranged in the same lens plate 12. Further sensors are provided as required, which are able to receive light from different directions. Non-directional ambient light may be additionally detected through a portion of the lens plate 12 that is not or only slightly optically active.

The lens plate 12 may be produced using a conventional injection molding technique. As an alternative, a stamping technique may be employed.

To avoid a malfunction caused by light being coupled in and/or out in an undesirable fashion, the possible causes of which will be discussed in more detail below, at least part of the optically non-active surfaces of the lens plate 12 is provided with refractive or reflective structures, such as, e.g., retroreflective elements (so-called reflex reflectors). This causes light that is not incident on the optically active surfaces to be deflected into "harmless" directions. Alternatively, the optically non-active portion may be provided on one or both sides with a printing that is impervious to light. In fact, basically there is the possibility that in addition to the desirable parallel pencil of rays that is used for the illumination of the windshield 10 at an angle of 45 degrees, further, undesirable light rays illuminate objects such as grains of sand, which are located in front of the front face of the windshield 10 and thus do not constitute any wetting. Part of the light rays may be reflected on these objects again and may possibly arrive at the light receiver 26 in this way. Furthermore, as already mentioned earlier, extraneous light acting from the outside (e.g., sunlight) may reach the light receiver 26. Also, light from the light emitter 24 may possibly arrive at the light receiver 26 directly by multiple reflection (i.e. without the "detour" through the windshield 10). All of these effects may lead to a false recognition of wetting.

The invention claimed is:

1. An optical sensor device, adapted to be coupled to a pane and comprising a sensor unit which includes a light emitter, a light receiver, and a lens plate that is used for coupling a pencil of rays, radiated by the light emitter, into and out of the pane and directing it onto the light receiver, the lens plate including a combined Fresnel structure having a Fresnel lens structure and a Fresnel reflector structure on a first surface facing the light emitter and the light receiver, and a Fresnel reflector structure on an opposite, second surface facing the pane.

2. The optical sensor device according to claim 1, wherein the combined Fresnel structure of the first surface reshapes a diverging pencil of rays into a parallel pencil of rays.

3. The optical sensor device according to claim 1, wherein the combined Fresnel structure of the first surface reshapes a parallel pencil of rays coupled out of the pane and traversing the lens plate into a converging pencil of rays.

4. The optical sensor device according to claim 3, wherein the lens plate is designed such that the parallel pencil of rays traverses the lens plate perpendicularly.

5. The optical sensor device according to claim 1, wherein the combined Fresnel structure of the first surface is a rotationally symmetrical structure for focusing a diverging or parallel pencil of rays.

6. The optical sensor device according to claim 5, wherein the Fresnel reflector structure of the combined Fresnel structure has a larger radial distance from an axis of rotational symmetry than the Fresnel lens structure of the combined Fresnel structure.

7. The optical sensor device according to claim 1, wherein the Fresnel reflector structure of the second surface is a linear structure for deflecting a parallel pencil of rays into a specific direction.

8. The optical sensor device according to claim 1, wherein the lens plate is coupled to the pane by a coupler layer that is in form-fitting contact with the Fresnel reflector structure of the second surface.

9. The optical sensor device according to claim 1, wherein the Fresnel reflector structure of the second surface reflects at internal surfaces.

10. The optical sensor device according to claim 1, wherein the Fresnel reflector structure of the second surface is generally sawtooth-shaped in cross-section, having first flanks, having entry or exit surfaces at which the reflection occurs, and second flanks, at which a parallel pencil of rays enters or exits, respectively.

11. The optical sensor device according to claim 10, wherein the second flanks are traversed perpendicularly.

12. The optical sensor device according to claim 10, wherein a refraction of light is effected at the second flanks.

13. The optical sensor device according to claim 11, wherein the second flanks have two sections of different steepness, the less steep sections forming the entry and exit surfaces.

14. The optical sensor device according to claim 12, wherein the second flanks from entry or exit surfaces, respectively, which are steeper than the first flanks.

15. The optical sensor device according to claim 10, wherein the first and second flanks are made to be substantially symmetrical to relation to each other.

16. The optical sensor device according to claim 1, comprising at least one sensor unit, for which there are formed in the lens plate two separate, combined Fresnel structures adjacent to each other, including a Fresnel lens structure and a Fresnel reflector structure, with oppositely located Fresnel reflector structures, the light emitter being arranged in the focal point of one Fresnel lens structure and the light receiver being arranged in the focal point of the other Fresnel lens structure, the pencil of rays emitted by the light emitter being collimated by the one combined Fresnel structure, passing perpendicularly through the lens plate, being directed against the pane at an angle by the opposite Fresnel reflector structure and totally reflected by the pane, and then being coupled into the lens plate by the Fresnel reflector structure opposite to the other combined Fresnel structure and being directed perpendicularly through the lens plate onto the other combined Fresnel structure and focused onto the light receiver by the other combined Fresnel structure.

17. The optical sensor device according to claim 16, including a number of sensor units which have a shared lens plate (12).

18. The optical sensor device according to claim 16, further including another sensor unit which includes another light receiver and another lens plate that is used for coupling a pencil of rays, incident on the pane, out of the pane and directing it onto the other light receiver, the other lens plate including another combined Fresnel structure having a Fresnel lens structure and a Fresnel reflector structure on a first surface facing the other light receiver, and another Fresnel reflector structure on an opposite, second surface facing the pane, a pencil of rays incident on the pane at a narrow angle of detection traverses the pane at an angle and is then coupled into the other lens plate by the other Fresnel reflector structure opposite to the pane and directed perpendicularly through the other lens plate onto the other combined Fresnel structure and focused onto the other light receiver by the other combined Fresnel structure, the sensor units having a shared lens plate.

19. An optical sensor device, adapted to be coupled to a pane and comprising a sensor unit which includes a light receiver and a lens plate that is used for coupling a pencil of rays, incident on the pane, out of the pane and directing it onto the light receiver, the lens plate including a combined Fresnel structure having a Fresnel lens structure and a Fresnel reflector structure on a first surface facing the light receiver, and a Fresnel reflector structure on an opposite, second surface facing the pane.

20. The optical sensor device according to claim 19, wherein a pencil of rays incident on the pane at a narrow angle of detection traverses the pane at an angle and is then coupled into the lens plate by the Fresnel reflector structure opposite to the pane and directed perpendicularly through the lens plate onto the combined Fresnel structure and focused onto the light receiver by the other combined Fresnel structure.

* * * * *